May 7, 1929.   G. C. THOMAS, JR   1,711,552
CABLE CONNECTER
Filed July 26, 1926
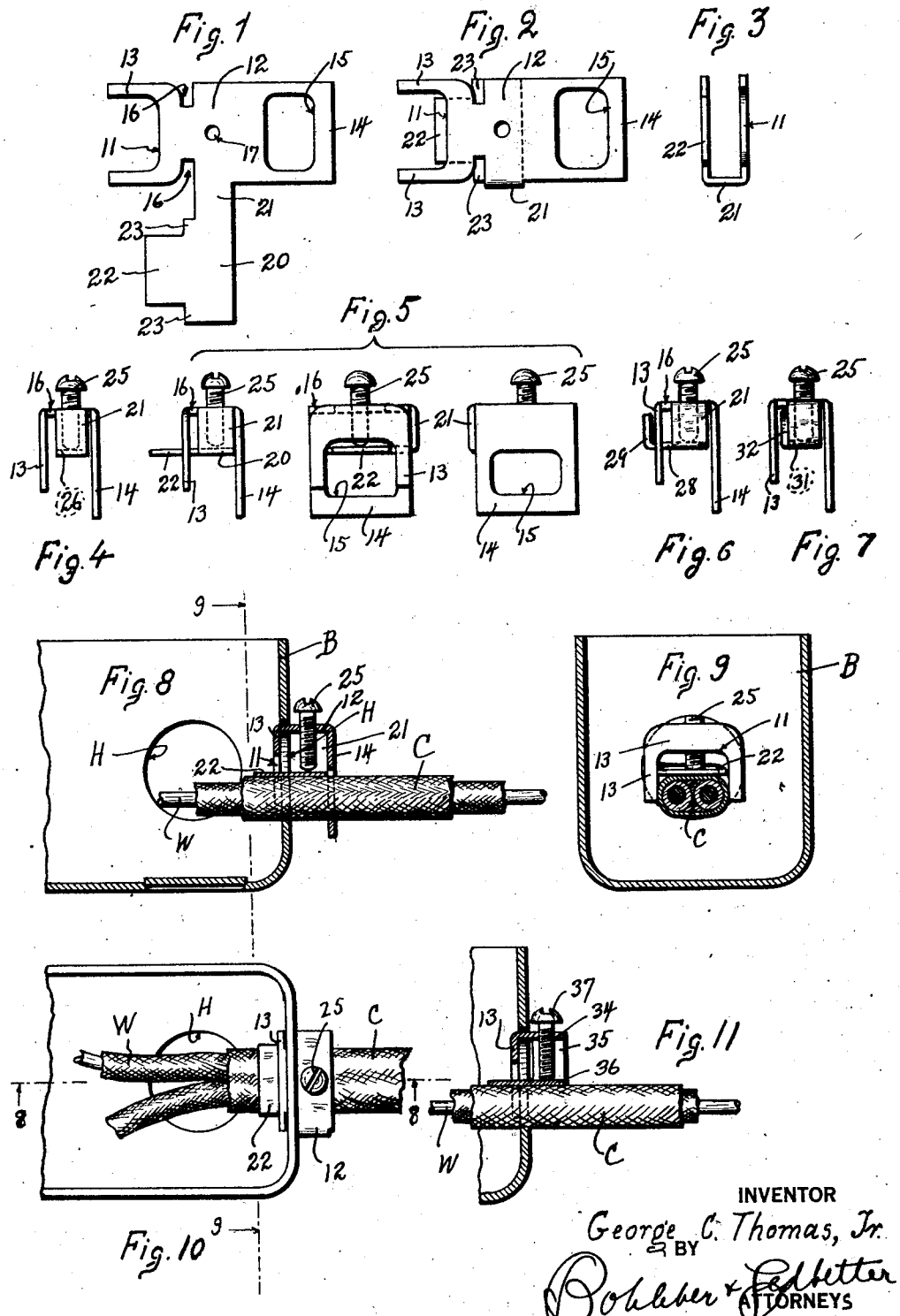
INVENTOR
George C. Thomas, Jr.
BY
ATTORNEYS Patented May 7, 1929.

1,711,552

UNITED STATES PATENT OFFICE.

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY.

CABLE CONNECTER.

Application filed July 26, 1926. Serial No. 124,820.

The invention relates to cable box and connecting means and more particularly to new and useful cable connecters for attaching cable to electric fixture boxes and the like.

An object of the invention is to produce an improved cable connecter of the type which leaves exposed a part of the box hole edge and which is capable of anchoring itself and a cable to the box hole edge without screw fastening means directly connected with or extending through the box; and further it is an object to improve the connecter with respect to effectively adapting it for fastening soft cable or fibre covered cable to the box hole edge.

A further object is to improve the connecter with respect to its cable bearing clamp means by which the pressure of an operating means, as a screw, is applied to the cable without damaging the cable from the screw end and to force the cable against the exposed box hole edge to grip and anchor it there.

The accompanying drawing shows an example of the invention serving to explain its principle, construction and mode of application to an electric fixture box.

The first three figures show the connecter plate blanked or stamped from sheet metal and illustrates the manner of fashioning a cable connecter from a single stamped piece.

Figure 1 shows a plan view of the stamping with its outstanding cable bearing clamp plate of improved character. Figure 2 shows a similar plan view but with the cable clamp folded in under the connecter plate. Figure 3 shows an end edge view of Figure 2.

Figure 5 shows a side elevation and both end elevations of the completely assembled connecter made from the Figure 1 stamping.

Figures 4, 6 and 7 illustrate various modified forms of the invention the construction of which is slightly varied to disclose broadly, that the principle of the invention is susceptible to variations in structure without departing from the principles of the invention.

Figure 8 shows a sectional assembly view illustrating how the connecter is employed to attach a cable to the box.

Figure 9 is a sectional assembly view taken on the line 9—9 of Figures 8 and 10.

Figure 10 is a top assembly view of the box with connecter and cable attached thereto.

Figure 11 is a box assembly view in longitudinal section of a simplified form of the connecter.

Electric fixture boxes B are made with cable and connecter receiving holes H into which a cable C is introduced and attached to the box by use of my improved connecter, and wiring connection may then be made inside the box with the wires W.

The connecter plate stamping or blank comprises a connecter plate body 12 on one end of which may be formed a box wall abutment 13 having a cable passage 11, and on the other end 14 of which may be provided a cable passage 15. The two passages 11 and 15 admit the cable into or through the connecter. The box wall abutment 13 may be made in the form of a fork if desired or in other forms. Suitable box hole edge anchorage means are made between the abutment 13 and body 12 and may consist of notches 16 made in alignment just between the portions 13 and 12. A threaded screw hole 17 is formed in the connecter plate of body 12 adjacent the notches 16.

An improved cable clamp bearing plate 20, or cable clamp, is integral with a flexible neck 21 which is itself integrally included with the connecter plate body 12. A bearing tongue 22 is integral with the cable clamp 20 and projects forwardly in the same direction with the abutment member 13 and the tongue 22 is formed narrow enough to reach through the cable passage 11 provided through the abutment 13 to transmit and distribute pressure developed by operating means, as a screw, so as to grip the cable against the exposed box hole edge.

The forwardly projecting bearing tongue 22 is made sufficiently narrow to extend through the cable passage 11 of the abutment member 13 but in order to broaden the bearing tongue 22 at the point where a maximum distribution of pressure is desired, the said tongue may include a relatively broad part 23 which is in alignment with the box hole edge anchorage notches 16 and thus is directly over that part of the cable which rests on the box hole edge so that direct gripping pressure is attained.

Furthermore the abutment 13, when bent back at right angles to the body 12, rests or stops against the edge portion 23 which thus aids and guides in forming up, i. e. bending the connecter portions into form.

By reference to Figure 2 and other views, it is seen how the flexible neck 21 is bent at right angles to the connecter body 12 by which to dispose the cable clamp 20 underneath the plate 12 and the neck 21 at right angles thereto to extend the bearing tongue 22 through the opening 11 of the abutment fork 13. The neck therefore bends or flexes on an axis parallel to the axis of the cable passages 11 and 15.

A further right angular bend is made in the connecter plate by bending the end 14 including passage 15 down at right angles to the connecter plate 12. Also, the abutment fork or member 13 is likewise bent at right angles to the connecter plate 12 adjacent the notches 16 so as to bring the two passages 11 and 15 into axial alignment, and the position of the cable clamp portions 20 and 22 is such that it is disposed above or in alignment with the upper edges defining the passages 11 and 15 so as to dispose said cable clamp between the passages and the connecter plate 12.

Figure 5 shows three views of the completed connecter made from the stamping of Figure 1, and shows a screw 25, as operating means, mounted in the threaded hole 17 of the stamping and directed or pointed towards the cable C when the connecter is mounted in the hole box H. After the connecter is fashioned into final form, the abutment member 13 stands parallel to the end portion 14 with the screw placed therebetween. Also the cable clamp 20—22 is disposed underneath the screw in substantially parallel relation to the connecter plate body 12 and furthermore, the broad portions 23 of the cable clamp 20 are directly in alignment with the box hole edge notches 16 and the abutment plate portion 13 fits up close to the edges 23.

The connecter shown in the first three figures and Figure 5, is mounted in the box B in Figures 8, 9 and 10; and the connecter is placed in the box hole H with the notches 16 in registry with the box hole edge whereupon the cable C is placed in the box hole under the cable clamp and the screw is run down in tight relation against the clamp 20. The cable clamp 20 together with the tongue 22 distributes the pressure of the screw evenly against the cable and bears it downwardly against the exposed box hole edge, and the reaction of the screw from some stationary part, as the cable C, seats the notches over the box hole edge to anchor the connecter in the box against longitudinal displacement.

Referring to that form of the invention shown in Figure 4, it is to be noted that tongue 22 and broad bearing portion 23 of Figure 1 are cut off to provide a cable bearing clamp plate 26, or in fact the neck 21 and cable clamp 26 are one and the same piece and of about equal width. The connecter of Figure 4 is similar in all other respects to the connecter hereinbefore described except that said cable clamp 26 may be narrow in width and does not extend through the abutment member 13. This form of connecter is well adapted for a certain kind of work.

Referring now to Figure 6 for still another form of connecter, there is shown a projecting clamp plate 28 somewhat similar to the cable clamp 20 hereinbefore described, but the cable clamp 28 is upturned on the outer end as shown at 29 and thus the cable clamp 28 is guided somewhat in its up and down movement by reason of the outer part 29 sliding in close relation to the outer surface of the abutment member 13. Furthermore, the upturned end 29 acts as a rib to stiffen the cable clamp 28 so that it flexes under pressure of the screw only at the neck 21, and by reason of the clamp plate 28 being stiffened by the upturned ear 29, said portion 28 stands flat against the cable C under pressure of the screw 29 and does not deform under great pressure of the screw.

Figure 7 shows a further variation in structure of the cable connecter with the cable clamp 31 upturned rounded end 32 placed on the inside of the abutment member 13. Thus the upturned part 32 stiffens and makes the cable clamp 31 rigid if desired and makes a neat strong construction. The rounded stiffening rib 32 may to advantage be less or smaller than the diameter of the box hole H into which the connecter is placed so as not to interfere with reception of the box hole edge into the anchorage means or notches 16.

Referring to the box assembly view Figure 11, there is shown another modified form of the invention wherein the outer end 14 of Figure 1 is omitted to produce a connecter having a neck 35 integral on an upper screw carrying connecter plate 34 and a long bearing clamp plate 36 integral with the neck 35 and pressed down against the cable C by a screw 37. In this connecter, the inner box wall abutment 13 is employed with box hole edge notches identically as shown in Figure 1, and the length of the bearing clamp plate 36 is optional. The screw bears on the bearing clamp plate to grip it against the exposed box hole edge and reacts to seat the connecter plate 34 against the box hole edge to anchor it in the box wall.

What I claim is:

1. A cable and box connecter comprising, a connecter plate small enough to fit into a box hole and formed to expose a part of the hole edge directly to a cable, anchorage means on the plate for fastening onto the box hole edge, a screw threaded through the connecter plate and adapted to react from a cable to seat the anchorage means against a box hole edge, a cable clamp included on the connecter plate and flexibly attached on the side thereof by a narrow neck which bends on an axis parallel to the axis of the connecter, and said cable clamp being folded back under the connecter plate and under the screw and including a bearing plate which is sufficiently long to extend under the anchorage means over an edge of the box hole to apply pressure on the cable from the screw.

2. A cable and box connecter as defined in claim 1 wherein an abutment is included at right angles on the connecter plate adjacent the box hole anchorage means and which rests against the box wall, and said connecter plate being provided with a cable passage formed on the outer end beyond the narrow neck and bent at right angles to the connecter plate and through which the cable extends.

3. A connecter made from a stamped connecter plate having a box wall abutment at one end and having a cable passage at the other end, and provided with box hole edge anchorage means adjacent the abutment, and including an outstanding cable bearing clamp plate bendable on the connecter plate on an axis parallel to the axis of the connecter, and operating means to bear the clamp plate against a cable and react to seat the box hole edge receiving means against a box.

4. A connecter made from a stamped connecter plate having a box wall abutment at one end and provided with box hole edge anchorage means adjacent the abutment, and including an outstanding cable bearing clamp plate bendable on the connecter plate on an axis parallel to the axis of the connecter, and operating means to bear the clamp plate against a cable and react to seat the box hole edge receiving means against a box.

5. A connecter made from a stamped connecter plate having a box wall abutment at one end, and provided with box hole edge anchorage means adjacent the abutment, and including an outstanding cable bearing clamp plate bendable on the connecter plate on an axis parallel to the axis of the connecter, and a screw threaded through the connecter plate forcing against said cable bearing clamp plate and reacting to seat the box hole edge receiving means against a box.

6. A connecter made from a stamped connecter plate having a box wall abutment at one end and having a cable passage at the other end, and provided with box hole edge anchorage means adjacent the abutment, and including an outstanding cable bearing clamp plate bendable on the connecter plate on an axis parallel to the axis of the connecter, and a screw threaded through the connecter plate forcing against said cable bearing clamp plate and reacting to seat the box hole edge receiving means against a box.

7. A connecter comprising a plate provided with box hole edge anchorage means, and including a cable clamp and neck portion one edge of which is in substantial alignment with the anchorage means, said neck being bent on the connecter plate to fold the cable clamp under said connecter plate and adapted to flex to and from the anchorage means, and a screw threaded through the connecter plate adapted to deliver pressure on the cable clamp and produce a reaction therefrom to seat the anchorage means against a box.

8. A connecter made from a stamped connecter plate having a box wall abutment at one end and provided with box hole edge anchorage means adjacent the abutment, and including an outstanding cable bearing clamp plate bendable on the connecter plate on an axis parallel to the axis of the connecter, and a portion of the cable bearing clamp plate turned up at right angles to the clamp plate to form a stiffening rib to brace the clamp plate against deforming under pressure of the screw, and operating means to bear the clamp plate against a cable and react to seat the box hole edge anchorage means against a box.

In testimony whereof I affix my signature.

GEORGE C. THOMAS, Jr.